United States Patent
Riley et al.

(10) Patent No.: US 9,453,916 B2
(45) Date of Patent: Sep. 27, 2016

(54) FILTERING OUT A JAMMER SIGNAL

(71) Applicant: Trimble Navigation Limited, Sunnyvale, CA (US)

(72) Inventors: Stuart Riley, San Jose, CA (US); Eric Krantz, Emerald Hills, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 938 days.

(21) Appl. No.: 13/728,525

(22) Filed: Dec. 27, 2012

(65) Prior Publication Data
US 2014/0184443 A1    Jul. 3, 2014

(51) Int. Cl.
| G01S 19/21 | (2010.01) |
| G01S 19/36 | (2010.01) |
| H04B 1/18  | (2006.01) |
| H04B 1/10  | (2006.01) |

(52) U.S. Cl.
CPC ........... *G01S 19/21* (2013.01); *G01S 19/36* (2013.01); *H04B 1/109* (2013.01); *H04B 1/1027* (2013.01); *H04B 1/18* (2013.01); *H04B 2001/1045* (2013.01); *H04B 2001/1054* (2013.01)

(58) Field of Classification Search
CPC ..... G01S 19/21; G01S 19/36; H04B 1/1027; H04B 1/109; H04B 1/18; H04B 2001/1045; H04B 2001/1054
See application file for complete search history.

(56) References Cited

U.S. PATENT DOCUMENTS

| 5,339,455 | A  | * | 8/1994  | Vogt    | H03G 5/24  |
|           |    |   |         |         | 455/266    |
| 7,155,340 | B2 | * | 12/2006 | Churan  | H04B 7/18563 |
|           |    |   |         |         | 342/357.64 |
| 7,187,735 | B2 | * | 3/2007  | Kent, III | G01S 19/21 |
|           |    |   |         |         | 333/193    |
| 7,593,706 | B2 | * | 9/2009  | Bucknor | G01S 19/21 |
|           |    |   |         |         | 342/357.59 |
| 7,642,910 | B2 |   | 1/2010  | Eskildsen |          |
| 8,412,093 | B2 | * | 4/2013  | Liu     | G01S 19/21 |
|           |    |   |         |         | 375/147    |
| 8,897,407 | B2 | * | 11/2014 | Badke   | H04B 15/00 |
|           |    |   |         |         | 342/357.59 |
| 8,975,967 | B2 | * | 3/2015  | Ashjaee | H03F 3/191 |
|           |    |   |         |         | 330/302    |
| 2004/0146127 | A1 |   | 7/2004  | Kent, III et al. |   |
| 2004/0239559 | A1 | * | 12/2004 | King    | G01S 19/21 |
|           |    |   |         |         | 342/357.59 |
| 2008/0001731 | A1 |   | 1/2008  | Eskildsen |        |
| 2008/0214137 | A1 | * | 9/2008  | Qian    | H03J 5/244 |
|           |    |   |         |         | 455/307    |
| 2011/0095943 | A1 | * | 4/2011  | Letestu | G01S 19/32 |
|           |    |   |         |         | 342/357.72 |

OTHER PUBLICATIONS

Keegan, Rich. "Expert Advice: MSS Information, and Ten Truths," GPS World Dec. 1, 2011. pp. 1-6.*

* cited by examiner

*Primary Examiner* — Gregory C Issing
(74) *Attorney, Agent, or Firm* — Kilpatrick Townsend & Stockton LLP

(57) ABSTRACT

A low noise amplifier (LNA) assembly comprising a filter circuit for receiving signals from a Mobile Satellite Service (MSS) band and a Radio Navigation Satellite Service (RNSS) band; and an alternative filter circuit configured to filter out a jammer signal.

3 Claims, 8 Drawing Sheets

700

```
receive signals from a mobile satellite service (MSS) band and a Radio
Navigation Satellite Service (RNSS) band by a filter circuit by a filter circuit
710 allow all of the MSS band by the filter circuit.
    712
``` filter out a jammer signal by an alternative filter circuit
720 allow signals in at least a portion of said MSS band by said alternative filter circuit
730 allow a signals in a range of 1555 MHz to 1559 MHz by said alternative filter circuit
732 switch to the alternative filter circuit, in response to detecting the jammer signal
740 dynamically switch to said alternative filter circuit, in response to detecting said jammer signal
750 switch to the filter circuit, in response to not detecting the jammer signal
760 combine L1 signals and L2 signals
770 alternatively switching between a plurality of filter circuits for filtering L2 signals
780

Figure 7

FILTERING OUT A JAMMER SIGNAL

BACKGROUND

Typically, a GNSS receiver receives relatively weak positioning signals from satellites. The antenna sub-assembly of the GNSS receiver utilizes amplifiers to amplify the relative weak signals. However, the antenna assembly, in particular the amplifiers, are susceptible to interference from other high power signals in the L band. As a result, the high power signals (or jammer signals) saturate the amplifiers, thus adversely affecting GNSS receiver performance. At high enough jammer power levels, the receiver can become inoperative and produce no useful output.

BRIEF DESCRIPTION OF THE DRAWINGS

FIG. 7 illustrates an embodiment of an apparatus for filtering out a jammer signal.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
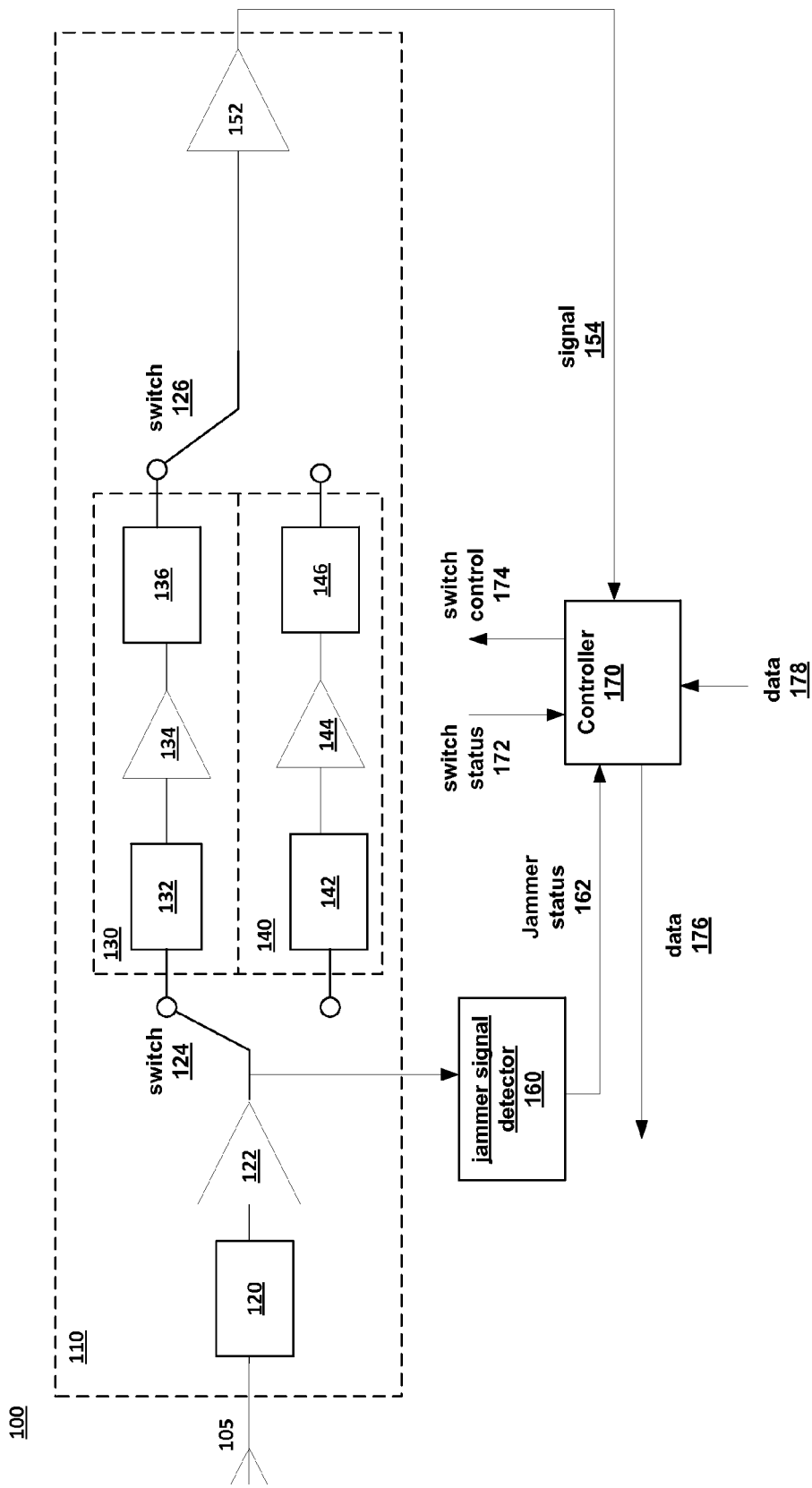
FIGS. 1-3 and 5 illustrates embodiments of a receiver antenna assembly sub-system.

FIG. 1 depicts an embodiment of an antenna sub-assembly 100 for use by a global navigation satellite system (GNSS) receiver which in various embodiments makes use of the Global Positioning System (GPS) or Global Navigation Satellite System (GLONASS).

Figure 4A:
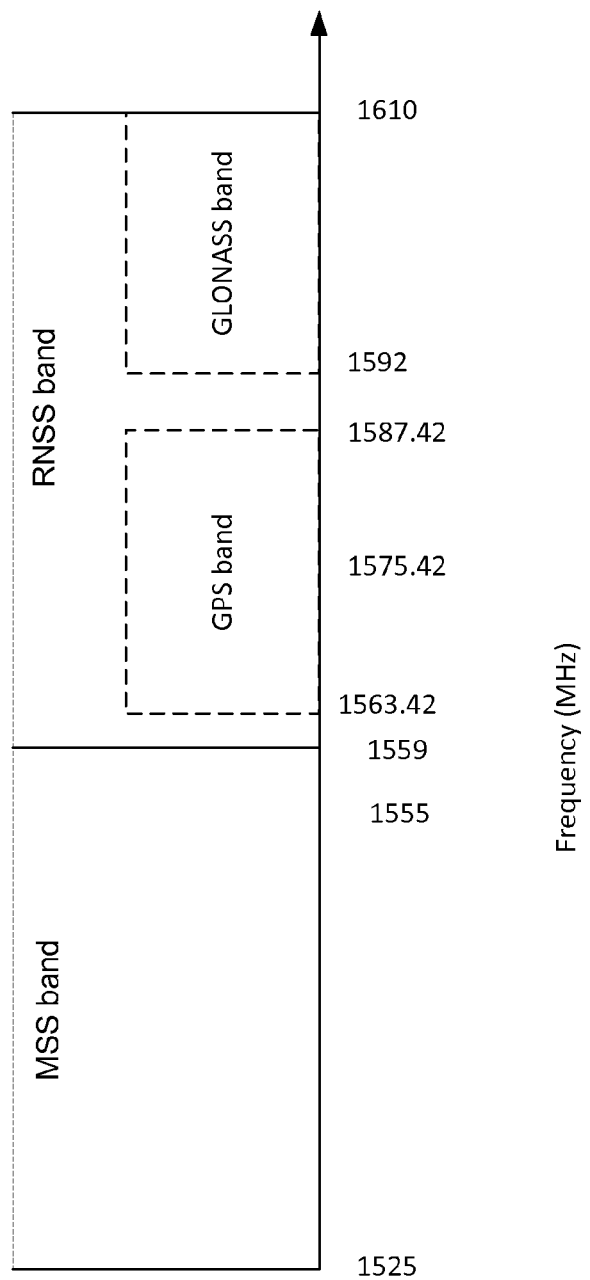
FIGS. 4A and 6 illustrates frequency bands of interest.

FIG. 4A depicts an embodiment of frequency bands of interest. For instance, the GNSS receiver operates in the Radio Navigation Satellite Service (RNSS) band, which is in the range of 1559 megahertz (MHz) to 1610 MHz. The RNSS band includes the GPS band which is in the range of 1563.42 MHz to 1587.42 MHz with a center of 1575.42 MHz, and the GLONASS band from 1592 MHz to 1610 MHz.

The GNSS receiver may also utilize the Mobile Satellite Service (MSS) band which is adjacent the RNSS band. The MSS band is in the range of 1525 MHz to 1559 MHz. The MSS band may be utilized for an additional communication link to receive signals from satellites.

Typically, the MSS band is very quiet in that the power spectral density at the earth's surface is low in comparison to signals in other bands. In other words, it is utilized for very low power space-to-earth signals, just as the GNSS signals have extremely low power at the earth's surface. However, the MSS band may be utilized for a high powered terrestrial broadband service, thus raising the power spectral density. The high powered terrestrially based signals may severely impact the adjacent RNSS band where GNSS systems operate. The principal reason is that radio transmitters generate a signal whose power spectral density often extends beyond the bands where they are authorized to operate. This extension is referred to as "spillover." While there are often limits specified for reducing spillover from one band to another, these limits are created by regulatory bodies and are thus subject to negotiation. Further, it is very difficult to create a signal whose power spectral density changes abruptly from full power to a much smaller level, at the band edge. The power levels of spillover signals can cause interference to other radio receivers operating in the adjacent band, particularly when the adjacent band is the GNSS band.

Figure 4B:
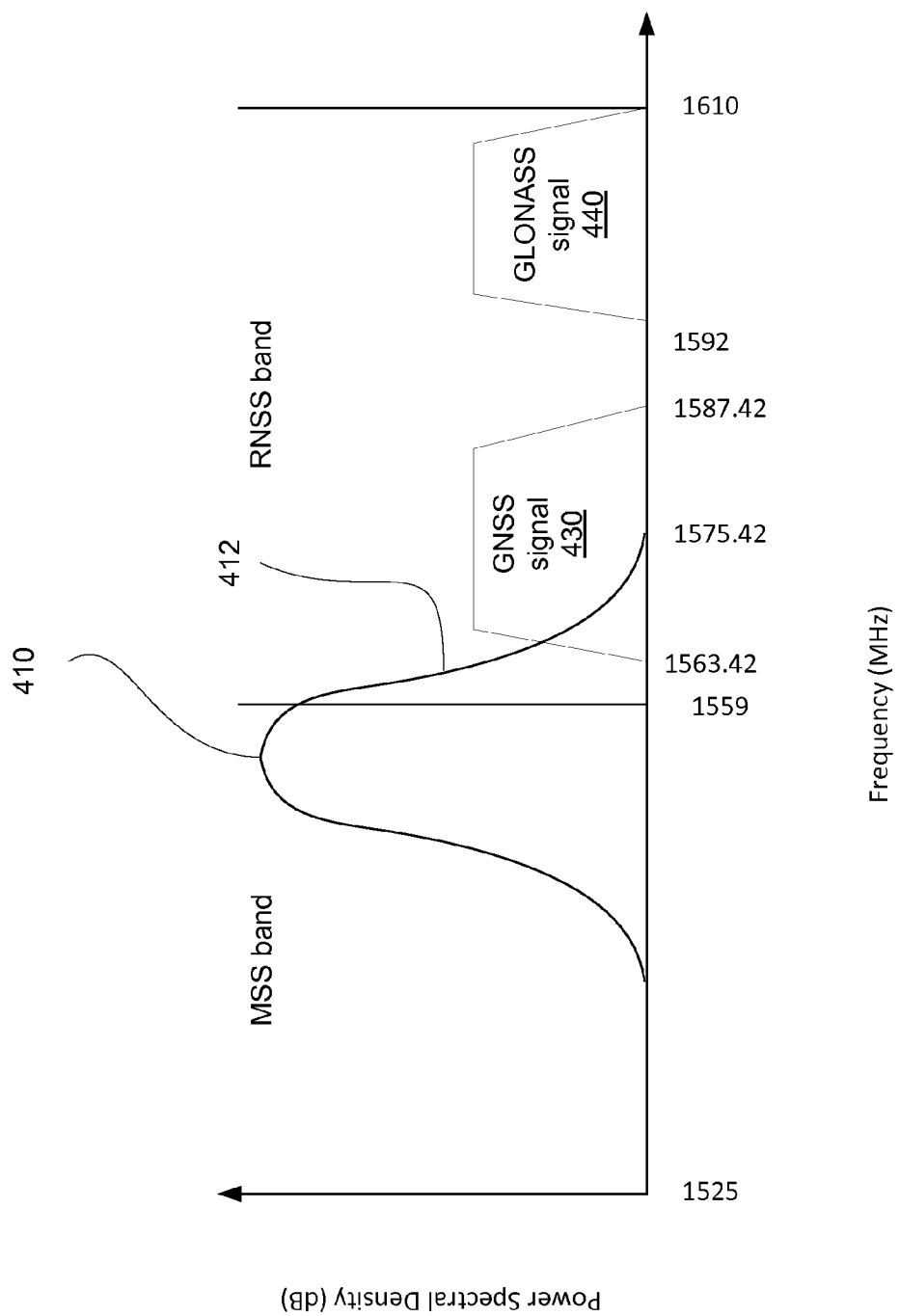
FIG. 4B illustrates a spectral density plot of frequency bands of interest.

FIG. 4B depicts an embodiment of a power spectral density versus frequency plot. The amplitude of any signal is represented by the vertical axis, and frequency is represented by the horizontal axis.

In particular, FIG. 4B depicts a comparison of relative power spectral density for space-to-ground signals. The terrestrial signal 410, in the MSS band, has a higher power spectral density than a MSS signal (not shown) from space, and is also higher than GNSS/GLONASS signals at 430 and 440, respectively. The power levels can be over 50 dBm stronger than the GNSS signals, which can cause serious degradation of the GNSS receiver performance. It can render the receiver unable to provide any useful output.

In particular, terrestrial signal 410 enters into the RNSS band and causes interference in the RNSS band. As such, terrestrial signal 410 can cause serious degradation of the GNSS receiver performance.

Terrestrial signal 410 can also be understood as a jammer or jammer signal. Jammer or jammer signal, as used herein, is any signal, or part of a signal that is transmitted into a band that a GNSS receiver utilizes for receiving positional signals.

Referring now to FIG. 1, antenna sub-assembly 100 includes LNA 110. In general, LNA 110 includes a series of filters and amplifiers used to amplify very weak signals captured by antenna 105 which are then processed by the GNSS receiver. All of the filters described herein are called band-pass filters, because they are designed to allow a specified frequency band to pass through the filter, and to attenuate signals on either side of the specified band. In other embodiments, other kinds of filters could be used in extreme situations, such as a notch filter, which attenuates signals in a given frequency band but allows signals outside that band to pass through unattenuated.

LNA 110 includes filter 120 and amplifier 122 which, in combination, is referred to as a low gain section. The low gain section includes a high enough 1 dB compression point such that amplifier 122 will not saturate by a jammer signal (e.g., terrestrial signal 410). Additionally, the low gain section sets the noise figure of the system. In one embodiment, filter 120 allows for signals received in the MSS band and the RNSS band to pass.

Figure 3:
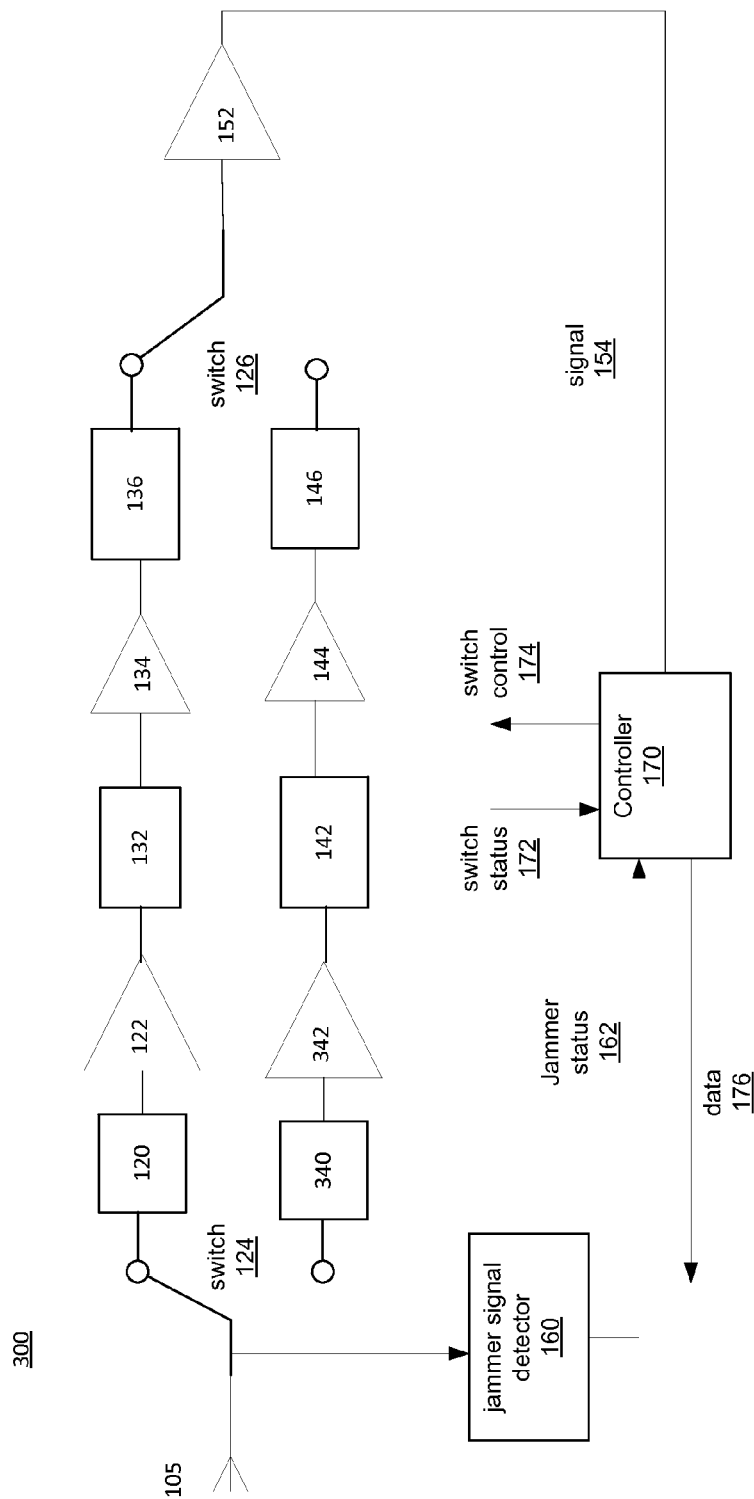

In one embodiment, a switch is disposed between antenna 105 and the low gain section, which will be further discussed in relation to FIG. 3.

LNA 110 includes a switch to switch between filter circuit 130 and alternative filter circuit 140. In particular, switch 124 and switch 126 operate simultaneously to switch between filter circuit 130 and alternative filter circuit 140 based on receiving a jammer signal or not receiving a jammer signal at antenna 105, which will become more evident below.

Filter circuit 130 is utilized when a jammer signal is not detected. For example, when a user of the GNSS system is in a rural area, there is no jammer signal (e.g., terrestrial signal 410) in the MSS band and jammer signal detector 160 does not detect a jammer signal. As such, switch 124 and switch 126 are positioned such that the positioning signal received by antenna 105 is filtered/amplified through filter circuit 130.

Filter circuit 130 is able to receive signals from a full bandwidth of the MSS and RNSS bands (i.e., from 1525 MHz to 1610 MHz). For instance, signals within the MSS band and/or the RNSS band are received by antenna 105 and subsequently transmitted to filter circuit 130. Accordingly, the positioning signal within the MSS band and/or the RNSS band (e.g., GNSS signal 430), which is received by antenna 105, is passed through and amplified by LNA 110.

In other embodiments, filter circuit 130 allows for signals within the entire MSS band or from a subset of the MSS band.

Filter circuit 130 includes filter 132, amplifier 134 and filter 136. However, any combination or number of filters and/or amplifiers may be utilized to appropriately filter/amplify the signal through filter circuit 130.

Alternative filter circuit 140 is an alternative filter circuit with respect to filter circuit 130. Alternative filter circuit 140 is utilized when a jammer signal is received by antenna 105 and subsequently detected. For example, when a user of the GNSS receiver is in an urban area, a jammer signal (e.g., terrestrial signal 410) is in the MSS band and is detected by jammer signal detector 160. As such, switch 124 and switch 126 are positioned such that the positioning signal (e.g., GNSS signal 430) received by antenna 105 is filtered/amplified through alternative filter circuit 140 and the jammer signal is filtered out by alternative filter circuit 140. As a result, the jammer signal does not saturate LNA 110 because it is filtered out by alternative filter circuit 140. In other words, alternative filter circuit 140 attenuates signals (e.g., the jammer signal) except the signals that are desired for proper and accurate functioning of the GNSS receiver. Again, this type of filter is a band-pass filter where the bandwidth is limited to a specific range.

The band-pass filters, in particular, the band-pass filters in alternative filter circuit 140, will have a steep "skirt." That is, they will provide a fast roll-off (loss of amplitude as a signal passes out of the pass-band) to reduce energy coming from external transmitters in adjacent bands that produce spillover.

The band-pass filters have particular characteristics. For example, the band-pass filters may be defined by bandwidth between their 3 db attenuation points. Below is a table that describes the particular characteristics of each band-pass filter described herein:

| Band-pass filter | 3 db Bandwidth |
|---|---|
| 120 | 85 MHz |
| 132 | 85 MHz |
| 136 | 85 MHz |
| 142 | 55 MHz |
| 146 | 55 MHz |
| 340 | 55 MHz |

In one embodiment, alternative filter circuit 140 filters out the spillover 412 of terrestrial signal 410, such that terrestrial signal 410 does not interfere with the GNSS receiver.

In one embodiment, alternative filter circuit 140 allows for L1 RNSS band. For example, alternative filter circuit 140 filters out all signals except for positioning signals in the L1 RNSS band.

In another embodiment, alternative filter circuit 140 filters out all signals from the MSS band. For example, alternative filter circuit 140 filters out all signals in the MSS band, however, it allows signals in the RNSS band to pass.

In a further embodiment, alternative filter circuit 140 allows for a portion of signals from the MSS band. For example, signals in the range of 1555 MHz to 1559 MHz, which are in the MSS band, are not filtered and allowed to pass through alternative filter circuit 140. As a result, the GNSS receiver can still use satellite downlinks in the MSS band.

In one example, controller 170 receives jammer status 162 from jammer signal detector 160. Switch 124 and switch 126 receive switch control 174 from controller 170 to switch from filter circuit 130 to alternative filter circuit 140 in response to detection of the jammer signal.

In one embodiment, switch 124 and switch 126 dynamically and simultaneously switch in response to a detected jammer signal. In other words, the switching is automated using a jam detect circuit. In another embodiment, switch 124 and switch 126 switch based on commands from the GNSS receiver.

Alternative filter circuit 140 includes filter 142, amplifier 144 and filter 146. However, any combination or number of filters and/or amplifiers may be utilized to appropriately filter out a jammer signal and properly filter/amplify the positioning signal through alternative filter circuit 140.

The positioning signal that is filtered/amplified through either filter circuit 130 or alternative filter circuit 140 is received at amplifier 152.

The amplified positioning signal 154 is received by controller 170 and subsequently transmitted to the GNSS receiver. For example, data 176, which includes the positioning signal 154, is sent to the GNSS receiver.

In various embodiments, controller 170 is also utilized for DC-bias, modulation/demodulation, etc. Moreover, controller 170 may modulate data 178 into the positioning signal as metadata. Data 178 can include, but is not limited to, serial number, product ID/part number, antenna calibration parameters, camera data, temperature, etc. Accordingly, data 178 can be implemented to enhance the functionality of the GNSS receiver. It should be appreciated that controller 170 can receive signals from an L2 section.

Data 178 is transmitted over a coaxial cable to the GNSS receiver. In one embodiment, antenna sub-assembly 100 is integrated within the GNSS receiver, for example, a handheld GNSS receiver. In another embodiment, antenna sub-assembly 100 is separate from the GNSS receiver, for example, a back pack GNSS receiver.

In various embodiments, data and/or power is received by antenna sub-assembly 100 from the GNSS receiver. For example, direct current is provided to antenna sub-assembly 100 by the GNSS receiver. In another example, instructions regarding switch control are provided to antenna sub-assembly 100 by the GNSS receiver.

Figure 2:
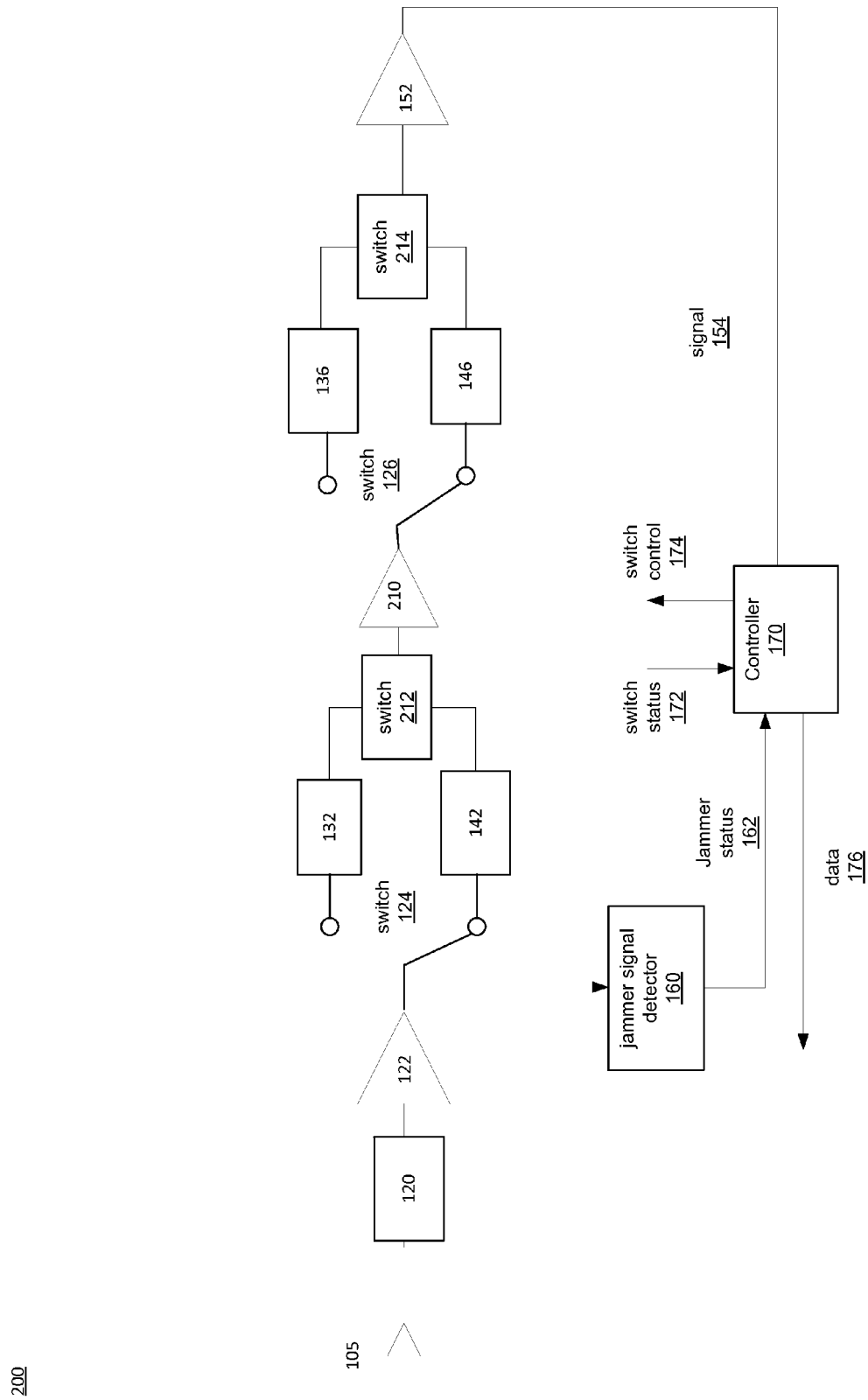

FIG. 2 depicts an embodiment of antenna sub-assembly 200. Antenna sub-assembly 200 functions similarly to antenna sub-assembly 100, as described above. However, antenna sub-assembly 200 depicts individual filters being switched with a common amplifier.

For example, if a jammer signal is not detected, then switches 124, 212, 126 and 214 allow for the positioning signal to pass through filter 132, amplifier 210, and filter 136. If a jammer signal is detected, then switches 124, 212, 126 and 214 allow for the position signal to pass through filter 142, amplifier 210, and filter 146. As a result, the positioning signal passes through a common amplifier (e.g., amplifier 210) whether or not a jammer signal is detected. In various embodiments, one or more of switch 212 and 214 is a combiner. Accordingly, the combiner(s) function effectively the same as switches 212 and 214.

FIG. 3 depicts an embodiment of antenna sub-assembly 300. Antenna sub-assembly 300 functions similarly to antenna sub-assembly 100, as described above. However, antenna sub-assembly 300 depicts switch 124 disposed between antenna 105 and filter 120 and 340.

For example, if a jammer signal is not detected, then switch 124 and switch 126 allow for the positioning signal to pass through filter 120, amplifier 122, filter 132, amplifier 134 and filter 136. If a jammer signal is detected, then switch 124 and switch 126 allow for the position signal to pass through filter 340, amplifier 342, filter 142, amplifier 144, and filter 146. In one embodiment, a combiner is substituted for switch 126.

Figure 5:
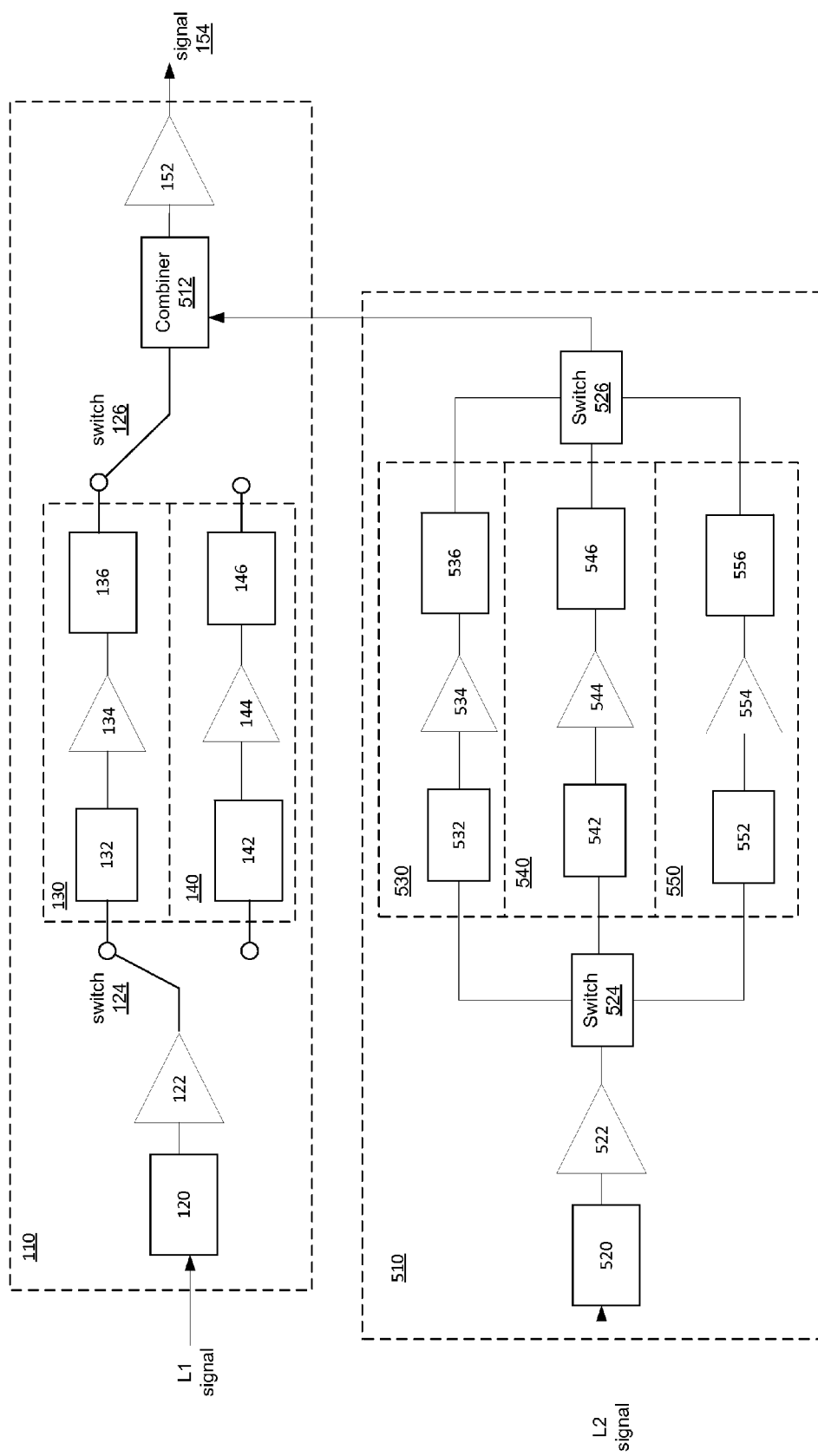

FIG. 5 depicts an embodiment of antenna sub-assembly 500 that receives both L1 and L2 signals and utilized by a high precision GNSS receiver. In general, the receiving of two different frequencies (i.e., L1 and L2 signals) reduces errors on the GNSS receiver. In particular, LNA 110 receives L1 signals, as described above, and L2 filter circuit 510 receives L2 signals.

Figure 6:
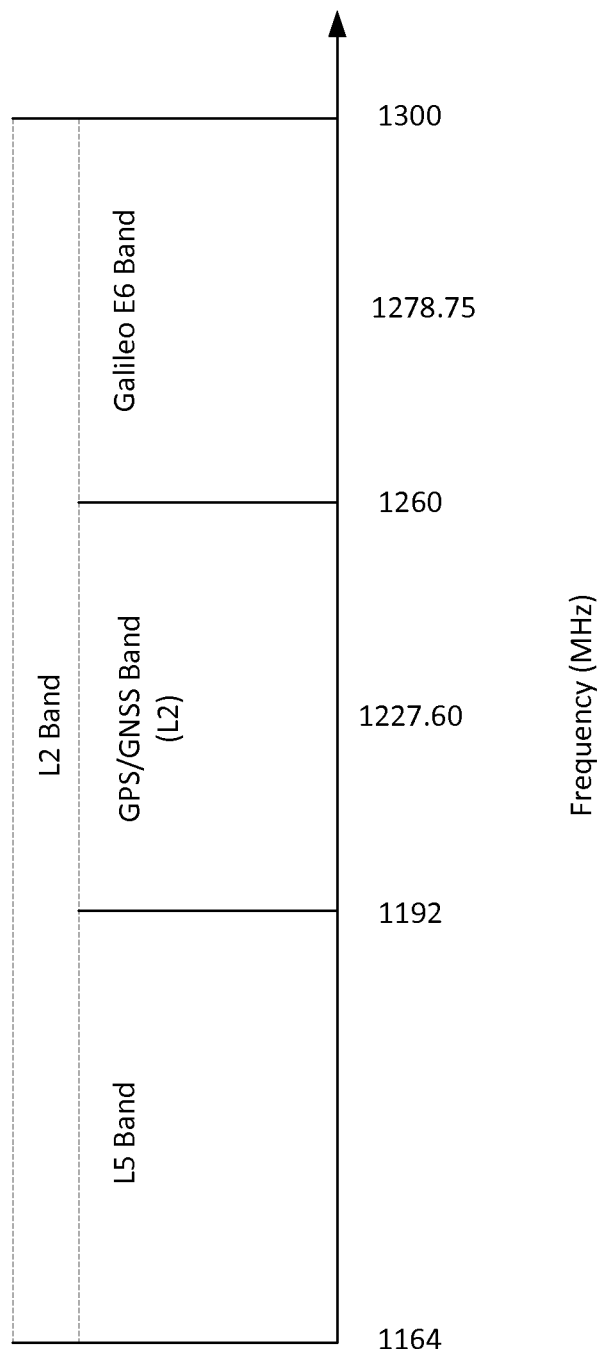

FIG. 6 depicts an embodiment of frequency bands of interest regarding the L2 band. The L2 band includes frequencies from 1166 MHz to 1300 MHz. The generic L2 band includes an L5 Band, GPS/GNSS Band (L2), and the Galileo E6 Band. The L5 band is centered at 1176.45 MHz and is reserved for a civilian safety-of-life band. The L5 Band bandwidth or band occupancy is from around 1164 to 1192 MHz. The L5 Band signals are similar to the L1 signals at 1575.42 MHz.

The GPS/GNSS Band (L2) is centered at 1227.60 MHz. It has approximately 21 MHz of band occupancy.

The Galileo E6 Band is another GNSS band, used by the Galileo satellite system created by the European Consortium. This band is specified to occupy 1260-1300 MHz, with a band center at 1278.75 MHz.

A jammer signal in any of the generic L2 band (e.g., L5, L2 and E6) may cause the GNSS receiver not to function properly. For instance, the power levels of spillover signals can cause interference to other radio receivers operating in the adjacent band, as described in detail above.

Antenna sub-assembly 500 includes LNA 110 which receives L1 signals, as described above, and L2 band filter 510.

L2 band filter 510 includes filter 520 and amplifier 522, which function similarly to filter 120 and amplifier 122, respectively, as described above.

L2 band filter 510 includes filter circuits 530, 540 and 550. It should be appreciated that filter circuits 530, 540 and 550 function similarly to filter circuit 130 and/or alternative filter circuit 140. That is, switches 524 and 526 alternatively switch to one of filter circuits 530, 540 and 550 in response to a jammer signal detected or not detected.

In various embodiments, filter circuits 530, 540 and 550 can block any signals from any band with a jammer signal. In other words, filter circuits 530, 540 and 550 can also allow any positional signal from any band that does not have a jammer signal.

It should be appreciated that L2 band filter 510 can be can any filter that filters frequency bands that are of particular importance to a GNSS receiver. Although L2 band filter 510 depicts three filter circuits (i.e., filter circuit 530, 540 and 55), it should be appreciated that L2 band filter 510 can include any number of different filter circuits.

In one embodiment, if there is no jammer signal detected in the L2 band, then switches 524 and 526 switch to filter circuit 530 such that the position signal in the L2 band is able to pass through and be received by combiner 512 in LNA 110.

Combiner 512 is for combining the L1 signal received and filtered by LNA 110 and the L2 signal received and filtered by L2 band filter 510.

In another embodiment, if a jammer signal in the E6 band is detected, then the L2 positioning signal is passed through filter circuit 540 which filters out signals in the E6 band and allows signals in the L5 and L2 bands to pass.

In a further embodiment, if a jammer signal in the L2 and E6 band is detected, then the L5 positioning signal is passed through filter circuit 550 which filters out signals in the E6 band and GPS/GNSS Band (L2) band.

As described above, band-pass filters have particular characteristics. For example, the band-pass filters may be defined by bandwidth between their 3 db attenuation points. Below is a table that describes the particular characteristics of each band-pass filter described with respect to FIG. 5:

| Band-pass filter | 3 db Bandwidth |
| --- | --- |
| 520 | 135 MHz |
| 532 | 135 MHz |
| 536 | 135 MHz |
| 542 | 90 MHz |
| 546 | 90 MHz |
| 552 | 50 MHz |
| 556 | 50 Hz |

FIG. 7 depicts an embodiment of method 700 for filtering out a jammer signal. In various embodiments, method 700 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 700 is performed at least by antenna assembly 100, as depicted in FIG. 1.

At 710 of method 700, a filter circuit receives signals from a MSS band and an RNSS band. For example, switch 124 and switch 126 switch to filter circuit 130 such that filter circuit 130 receives signals in a MSS band and an RNSS band based on a jammer signal not being detected. As a result, the positioning signal within the MSS band (and the RNSS band) is passed through and amplified by LNA 110.

In one embodiment, at 712, the filter circuit allows all of the MSS band. For example, filter circuit 130 receives and allows for position signals within the entire MSS band.

At 720, an alternative filter circuit filters out a jammer signal in the MSS band. For example, switch 124 and switch 126 switch to alternative filter circuit 140 such that alternative filter circuit 140 filters out jammer signal 410 in the MSS band. However, it should be appreciated that alternative filter circuit 140 allows for positioning signals within the RNSS band.

At 730, the alternative filter circuit allows for signals in at least a portion of the MSS band to pass. For example, alternative filter circuit 140 does not filter out a portion of the MSS band. In one embodiment, at 732, alternative filter circuit 140 allows signals in a range of 1555 MHz to 1559 MHz to pass through.

At 740, in response to detecting the jammer signal, switches 124 and 126 switch to the alternative filter circuit 140. For example, in response to jammer signal 410 detected by jammer signal detector 160, switches 124 and 126 switch to alternative filter circuit 140 such that alternative filter circuit 140 filters out jammer signal 410.

At 750, a switch dynamically switches to the alternative filter circuit in response to detecting in response to detecting the jammer signal. For example, switches 124 and 126 dynamically switch to alternative filter circuit 140, from filter circuit 130, in response to detection of jammer signal 410. In particular, the dynamic switching is in real-time based on a jam detect circuit.

At 760, switch to the filter circuit, in response to not detecting the jammer signal. For example, switches 124 and 126 switch from alternative filter circuit 140, to filter circuit 130, in response of a jammer signal not detected by jammer signal detector 160.

At 770, L1 and L2 signals are combined. For example, combiner 512 receives and then combines L1 and L2 signals. In particular, combiner 512 receives L1 signals from LNA 110 and L2 signals from L2 band filter 510.

At 780, alternatively switch between a plurality of filter circuits for filtering L2 signals. For example, switches 524 and 526 alternatively switch between filter circuits 530, 540 and 550 in response to a detection (or not detecting) a jammer signal in the L2 band.

Various embodiments of the present invention are thus described. While the present invention has been described in particular embodiments, it should be appreciated that the present invention should not be construed as limited by such embodiments, but rather construed according to the following claims.

The invention claimed is:

1. An antenna sub-assembly comprising:
   an antenna configured to receive position signals from a mobile satellite service (MSS) band and a Radio Navigation Satellite Service (RNSS) band;
   a jammer detector for detecting a jammer signal, the jammer signal being a terrestrial signal from the MSS band; and
   a low noise amplifier (LNA) assembly comprising a filter circuit configured to receive the position signals from the MSS band and the RNSS band, the filter circuit comprising a first stage, an amplifier, and a second stage, each of which being connected in series with each other;
   wherein the first stage of the filter circuit comprises:
      a first filter having an input and an output;
      a second filter having an input and an output;
      a first switch configured to switch between the input of the first filter and the input of the second filter; and
      a second switch configured to switch between the output of the first filter and the output of the second filter;
   wherein the second stage of the filter circuit comprises:
      a third filter having an input and an output;
      a fourth filter having an input and an output;
      a third switch configured to switch between the input of the third filter and the input of the fourth filter; and
      a fourth switch configured to switch between the output of the third filter and the output of the fourth filter;
   wherein the second filter and the fourth filter are configured to filtering out the jammer signal in response to detection of the jammer signal and wherein the first filter and the third filter are not configured to filter out the jammer signal;
   wherein the first filter and the third filter have larger bandwidths than the second filter and the fourth filter;
   wherein the first switch, the second switch, the third switch, and the fourth switch are configured to simultaneously switch in response to detection of the jammer signal, such that the first filter and the third filter are coupled together when the jammer signal is not detected, and the second filter and the fourth filter are coupled together when the jammer signal is detected.

2. The antenna sub-assembly of claim 1, further comprising:
   a switch controller for controlling the first switch, the second switch, the third switch, and the fourth switch.

3. The antenna sub-assembly of claim 1, wherein the antenna subassembly is utilized by a global navigation satellite system (GNSS) receiver.

* * * * *